United States Patent [19]
Oelbermann

[11] Patent Number: 4,855,062
[45] Date of Patent: Aug. 8, 1989

[54] APPARATUS AND PROCESS FOR REGULATING A FILTER PLATE CONTACT PRESSURE IN FILTER PRESSES

[76] Inventor: Max Oelbermann, Moltkestrasse 19, 5630 Remscheid, Fed. Rep. of Germany

[21] Appl. No.: 113,890

[22] Filed: Oct. 29, 1987

[30] Foreign Application Priority Data

Oct. 29, 1986 [DE] Fed. Rep. of Germany ....... 3636799

[51] Int. Cl.⁴ ...................... B01D 25/12; B01D 37/04; B30B 15/22
[52] U.S. Cl. ...................................... 210/739; 100/50; 100/99; 100/194; 210/97; 210/143; 210/224; 210/228; 210/230; 210/741; 210/770
[58] Field of Search .................. 100/50, 194, 196, 198, 100/99; 210/85, 91, 143, 224, 225, 226, 227, 228, 229, 230, 231, 741, 745, 746, 770, 808, 739, 97

[56] References Cited

U.S. PATENT DOCUMENTS 3,981,802 9/1976 Schotten et al. ..................... 210/230
4,118,778 10/1978 Strub .................................... 210/193

Primary Examiner—W. Gary Jones
Attorney, Agent, or Firm—Antonelli, Terry & Wands

[57] ABSTRACT

In order to regulate the filter plate contact pressure in a plate filter press comprising a hydraulic closing cylinder unit, the compression force prevailing in the filter plate pack, or the compression of at least one component such as, for example, a filter plate, exposed to the compression pressure ambient in the filter plate pack is utilized as a control variable. The hydraulic pressure of the closing cylinder unit is regulated so as to maintain a desired compression value.

9 Claims, 4 Drawing Sheets

APPARATUS AND PROCESS FOR REGULATING A FILTER PLATE CONTACT PRESSURE IN FILTER PRESSES

BACKGROUND OF THE INVENTION:

The present invention relates to a process and apparatus for regulating the filter plate contact pressure in a plate filter press comprising a hydraulic closing cylinder means.

In filter presses, the filter plates and, in plate-and-frame presses, the frames, are respectively arranged between two filter plates and are mounted on a horizontal or vertical guide means to be slidable or movable. In order to initiate a filtration process, the filter plates are moved together by a hydraulic closing cylinder unit to form a closed filter plate pack. In this process, a closing pressure must be exerted such that the filter chambers located between the filter plates are reliably sealed along the marginal edges thereof. During filtration, the slurry, fed into the filter chambers under a frequently high pressure, exerts an expansion pressure which is directed toward a spreading of the filter plate pack and such expansion pressure must be compensated for by a corresponding increase in the closing pressure. In the same manner, it is necessary in a membrane filter press to compensate for pressure of the press medium or, in filter presses, when the filter cake is washed out to compensate for the pressure of the wash water, by raising the closing pressure.

During the filtration process, the filter cake pressing step and the filter cake washing step, a high closing pressure is exerted on the filter plate pack such that this pressure, upon the elimination of the slurry, press medium, resulting in such a filter plate contact pressure that the filter plates or the optionally intermediately located filter frames, filter cloths, or press membranes would be destroyed.

In order to avoid the above noted problem, it has been proposed to regulate the closing pressure of the hydraulic closing cylinder unit in dependence upon an internal pressure respectively prevailing the in the filter plate pack. For this purpose, measurements are conducted to determine the hydraulic pressure of the closing cylinder unit and the pressures of the slurry, of the press medium, and of the wash water, with the pressure differential between the hydraulic closing pressure and the respectively exerted slurry, press medium, or wash water pressure being respectively determined in a difference-generating means, and with the closing pressure being controlled for maintaining a specific desired pressure differential. A disadvantage of this proposed arrangement resides in the fact that a considerable expense is necessary in the structural components since it is necessary to provide several pressure sensing units such as gauges, a selection unit with respect to the internal pressure to be compensated for in a particular case, i.e., slurry, press medium, or wash water, and a differential pressure generator. Furthermore, the differential pressure utilized therein as the control variable is in a only indirect connection with the actual contact pressure of the filter plates and, for this reason, this proposed type of regulation or control is inaccurate.

The aim underlying the present invention essentially resides in providing a process and apparatus for regulating the filter plate contact pressure which is inexpensive yet achieves a very high accuracy. In accordance with advantageous features of the present invention, the control variable utilized is the compression force prevailing in the filter plate pack or the compression of the entire filter plate pack or the compression of at least one part exposed to the compression pressure ambient in the filter plate pack. Moreover, the hydraulic pressure of the closing cylinder unit is regulated with a view toward maintaining a desired compression value.

In order to measure the compression force, it is possible, in accordance with the present invention, to employ, for example, dynamometer cells arranged at the end plate of the filter press. The compression force or the compression of the entire filter plate pack or also the compression of a portion exposed to the compression load is in direct correlation with the contact pressure exerted on the filter plates so that, with the use of such control variable, a very accurate monitoring is possible.

According to the present invention, the compression can be determined by utilizing only a single sensing device independently of the fact of whether the closing pressure acts against the pressure of the slurry, the pressure medium, or the wash water, whereby it is possible to minimize the cost for structural components to achieve the regulating method.

In accordance with advantageous features of the process of the present invention, the compression of the entire filter plate pack can be determined by a sensor detecting a position of a head plate of the filter press. For this purpose, it is possible to employ optical sensors, ultrasonic sensors, pneumatic sensors, microswitches, or non-contacting operating proximity switches, or the like.

Advantageously, according to the present invention, the compression of at least one filter plate, or a frame in a plate-and-frame press, or of a separate deformation plate exposed to the compression pressure may be measured by, for example, strain gauges. By virtue of the utilization of strain gauges, even minimum compression displacements can be accurately detected and reproduced.

In accordance with still further features of the process of the present invention, the compression pressure of the filter plate pack may be determined by one or more piezoelectric sensor means inserted in the filter plate pack or interposed between an end plate and the next-proximate filter plate. In this manner, it is possible to determine, at a relatively low cost with regard to structural components, a control variable for the effective filter plate contact pressure.

In order to carry out the process of the present invention wherein the compression is determined by strain gauges, a device may be provided wherein the strain gauges are arranged along narrow sides of at least one of the filter plates or one of the frames or the deformation plate with electrical output signals of the strain gauges being transmitted directly or through a measured value converter to an actual value-desired value comparator of a controller. A hydraulic pressure of the closing cylinder unit would then be regulated in dependence upon a correcting instruction from the controller. The strain gauges may be mounted directly to the narrow side of the filter plate of the frame or of the deformation plate by, for example, a suitable adhesive such as, glue. This construction is extremely simple in particular if the filter plate and, respectively, the frame or the deformation plate is made of a relatively strong compressible material such as, for example, an elastically compressible synthetic resin.

However, it is also possible in accordance with the present invention to arrange, along the narrow sides of the filter plate or the frame or of the deformation plate, one or more measuring elements which are deformed in case of compression of the filter plate or of the frame or of the deformation plate and to attach the strain gauges at the deformation zones of the measuring elements.

The measuring elements, if suitably constructed, undergo or experience a stronger deformation than that of the filter plate or similar members carrying such elements so that thereby the measuring sensitivity can be considerably increased. As can be appreciated, an increase in the measuring sensitivity by up to two powers of ten can be achieved by providing, according to the present invention, that the measuring element include an approximately U-shaped or arcuate member of, for example, steel, with a ridge of the U-shaped or arcuate member being oriented perpendicularly to the primary plane of the filter plates and the two bases being rigidly attached to a narrow side of the filter plate or the like. The ridge of the measuring element is subjected to a sagging upon compression of the filter plate carrying the same, there being present, on a ridge side facing away from the filter plate pack, a compression deformation zone. Preferably, according to the present invention, the strain gauges are mounted at the elongation deformation zone as well as at the compression deformation zone.

Additionally, according to the present invention, the strain gauges are arranged and the associated evaluating circuit is constructed in such a manner that temperature compensation is taken into account. The measures to be taken for such a temperature compensation are conventional in connection with measuring units comprising strain gauges and, consequently, a detailed discussion thereof is deemed unnecessary.

The above and other objects, advantages, and features of the present invention will become more apparent from the following description when taken in connection with the accompanying drawings which show several embodiments of the present invention.

Figure 1:
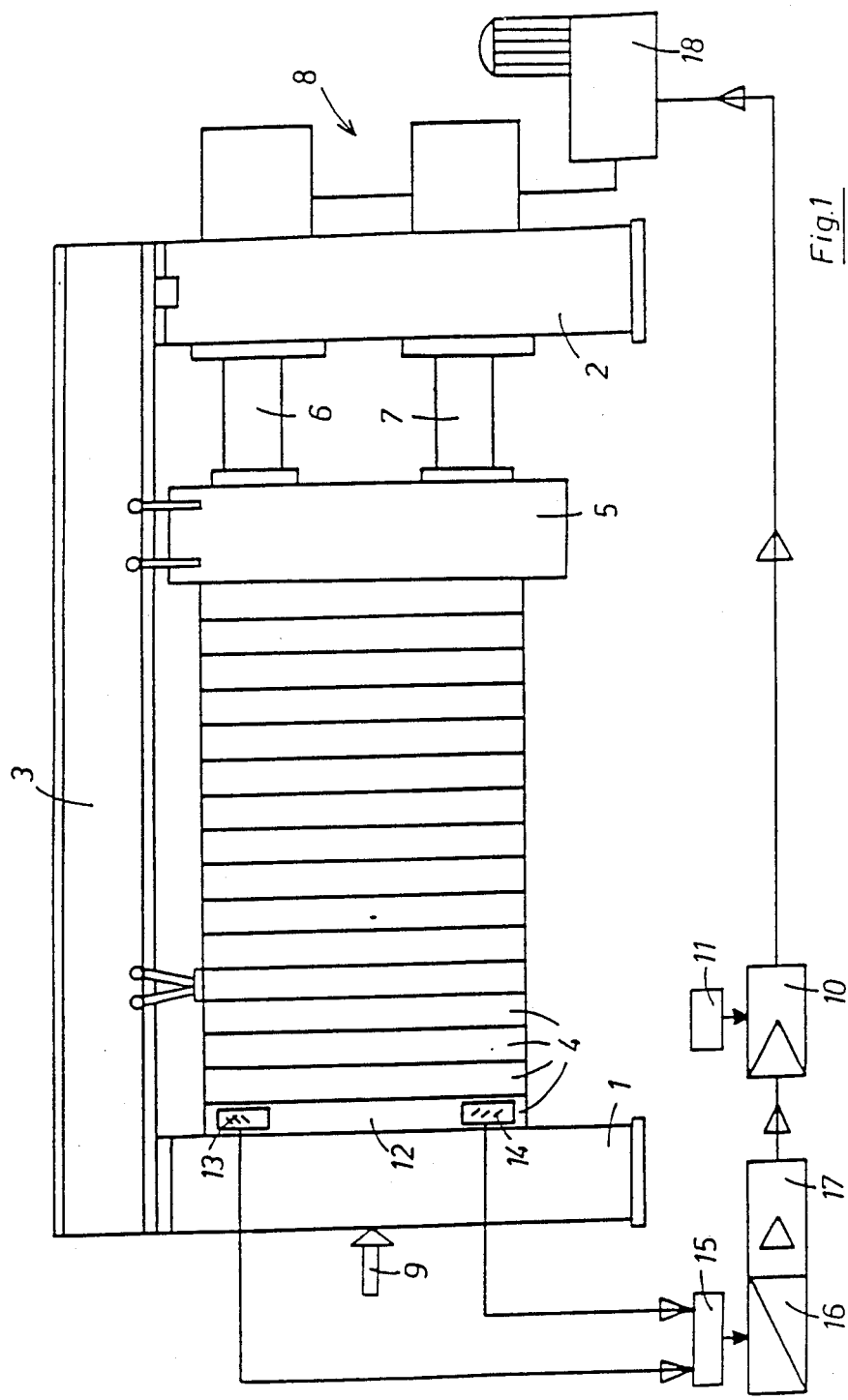
FIG. 1 is a partially schematic view of a plate filter press in accordance with the present invention for regulating the filter plate contact pressure

DETAILED DESCRIPTION:

Referring now to the drawings wherein like reference numerals are used throughout the various views to designate like parts and, more particularly, to FIG. 1, according to this figure, a filter plate press is provided with one or two I-shaped guide means 3 mounted on pedestals 1, 2, with a pack of filter plates 4 being movable suspended on the beams 3. The filter plates 4 are enclosed between a pedestal 1, acting simultaneously as an end plate, and a head plate 5 which is also movable on the guide beam 3. The filter plates 4 can be moved together to form a closed pack by a hydraulic closing cylinder unit generally designated by the reference numeral 8 which includes a plurality of closing cylinders 6, 7. A feed indicated by the arrow 9 of slurry, press medium, and wash water is effected in the zone of the end plate 1.

In order to regulate the filter plate contact pressure with a filter plate pack being closed, a control circuit is provided with a controller, of conventional construction, which is fed by a desired value generator 11, also of a conventional construction, with a variable corresponding to a desired value of the control variable. In this situation, the compression of the filter plate 4 neighboring or adjacent the end plate 1 is utilized as the control variable which is detected by way of strain gauges 13, 14 mounted directly to the narrow sides 12 of the filter plate 4.

In the embodiment of FIG. 1, the strain gauges 13, 14 are respectively arranged at the upper and lower corners of the filter plate 4, namely, on a front side thereof as shown in FIG. 1 and o a rear side of the filter plate in a manner not shown in FIG. 1. The electrical output signals of the strain gauges 13, 14 are combined into an evaluating circuit 15, of conventional construction, with temperature compensation and transmitted through a measurement converter 16, of conventional construction and an amplifier 17, of conventional construction, to the controller 10 as the actual value of the control variable. The controller 10 transmits, in dependence upon the control deviation, a correcting instruction to a hydraulic pump 18. The hydraulic pump 18 raises or lowers the hydraulic pressure for the closing cylinder unit 8 so that the control deviation that may exist is eliminated and constant filter plate contact pressure is maintained within the filter plate pack independently of the internal pressure prevailing in the filter plate pack.

In the construction of FIG. 1, it is possible to provide, as an alternative to the filter plate carrying the strain gauges 13, 14 movable along the guide beams 3, a separate elastically compressible deformation plate rigidly mounted to the end plate 1.

Figure 2:
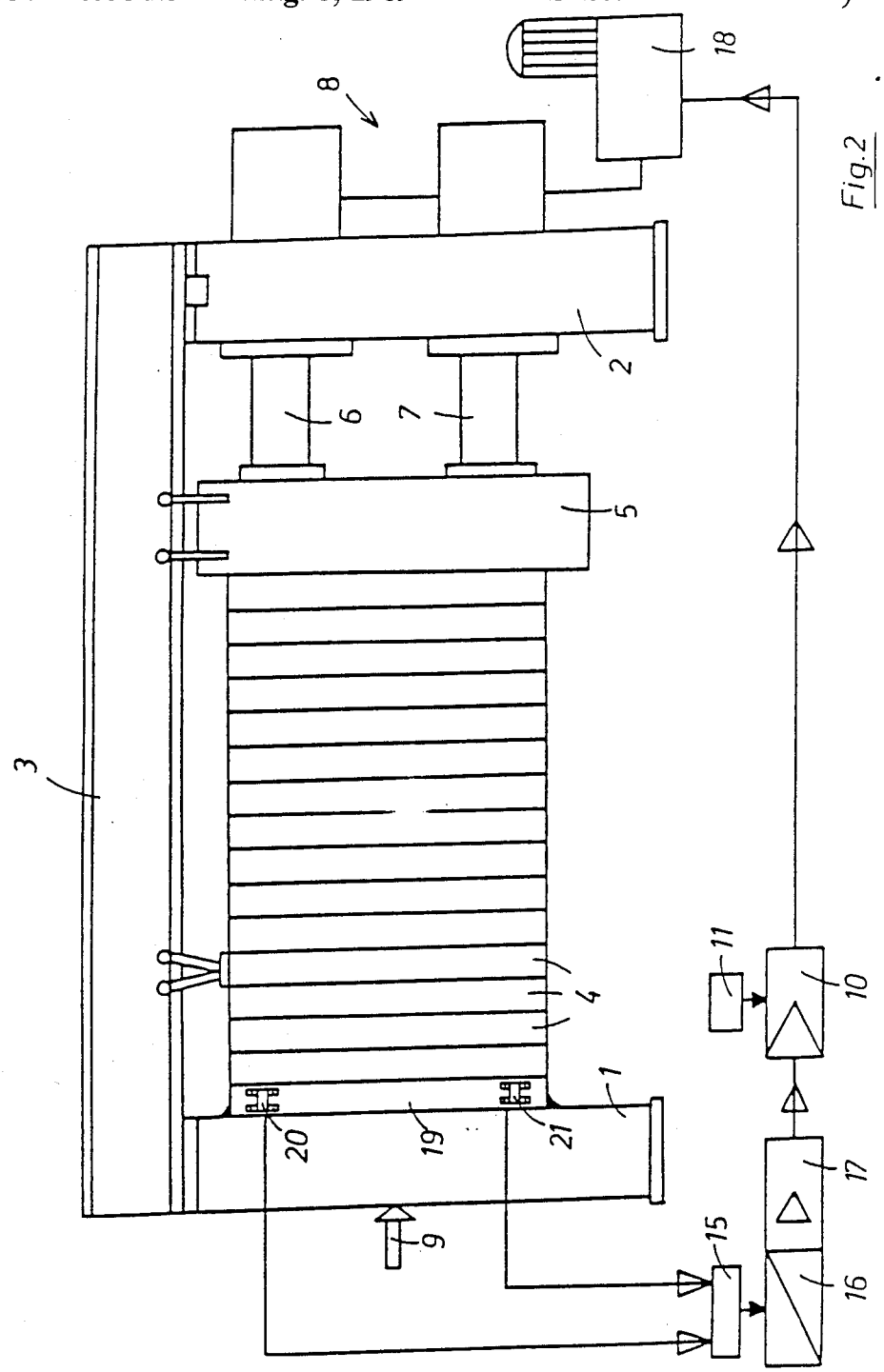
FIG. 2 is a partially schematic view of a filter plate press in accordance with another embodiment of the present invention for regulating the filter plate contact pressure.
Figure 3:
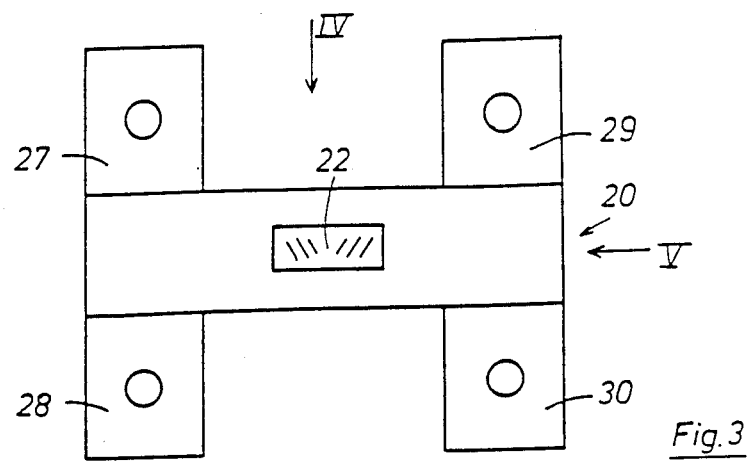
FIG. 3 is a schematic view, on an enlarged scale, of one of the measuring elements illustrated in FIG. 2.

In this connection, as shown in FIGS. 2–5, the deformation plate 19 may be attached to the end plate 1 and, in such situation, special measuring elements 20, 21 are attached to the narrow side and, in particular, at the four corners thereof, with the measuring elements 20, 21 carrying the strain gauges 22, 23 at the deformation zones thereof. The measuring elements 20, 21, as shown most clearly in FIG. 4, have a general U-shaped configuration and are oriented with a ridge 24 of the U-shape being disposed perpendicular to main planes of the filter plates 4, that is, in parallel to the compression pressure. The lateral legs of the U-shaped measuring element 20 are provided at bases 25, 26 with threaded flanges 27, 28, 29, and 30 as shown in FIG. 3 which project transversely to a longitudinal extension of the ridge 24.

Figure 4:
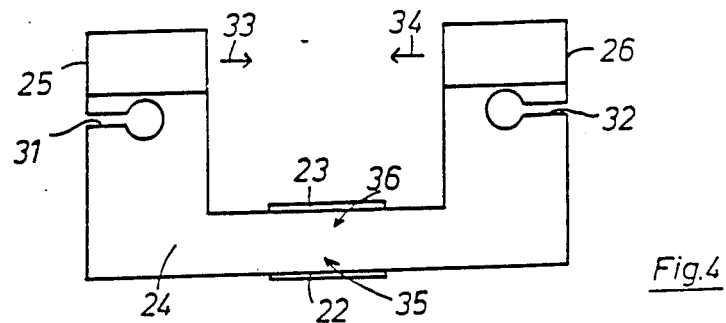
FIG. 4 is a top view, on an enlarged scale, of a measuring element as viewed in a direction of the arrow IV in FIG. 3.
Figure 5:
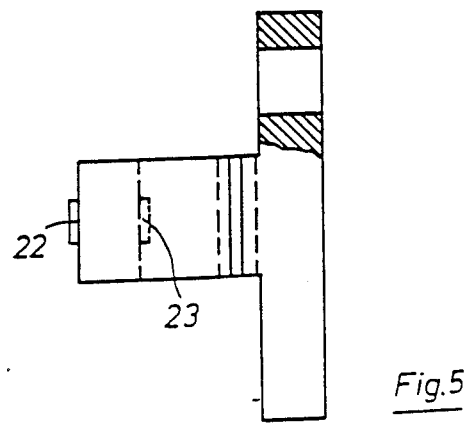
FIG. 5 is a top view of the measuring element as viewed in the direction of the arrow V in FIG. 3.

Moreover, as shown in FIG. 4, the lateral legs are provided with weakening slots 31, 32 disposed shortly above the bases thereof. Upon a compression of the deformation plate 19, the bases 25, 26 are moved toward each other in the direction indicated by the arrows 33, 34 in FIG. 4 whereby the ridge 24 is subjected to an outward bending action, there occurring on the side of the ridge 24 facing away from the filter plate pack an elongation deformation zone generally designated by the reference numeral 35 (FIG. 4) and on a side of the ridge 24 facing the filter plate pack a compression deformation zone generally designated by the reference numeral 36.

As is apparent from FIG. 4, strain gauges 22, 23 are mounted in each case of each measuring element at both deformation zones 35, 36. The measuring elements 20, 21 permit a very sensitive measurement of the deformation of the deformation plate and the strain gauges 22, 23 provided at these elements yield, in turn, an output signal corresponding exactly to the contact pressure with which the last filter plate 4 is in contact with the deformation plate 19. In all other respects, the construction of the control circuit in FIG. 2 corresponds to the construction of FIG. 1. Additionally, in the embodiment of FIG. 2, a movable filter plate 4 may be provided as an alternative to a separate deformation plate 19, with the measuring elements 20, 21 being mounted to the movable filter plate.

Figure 6:
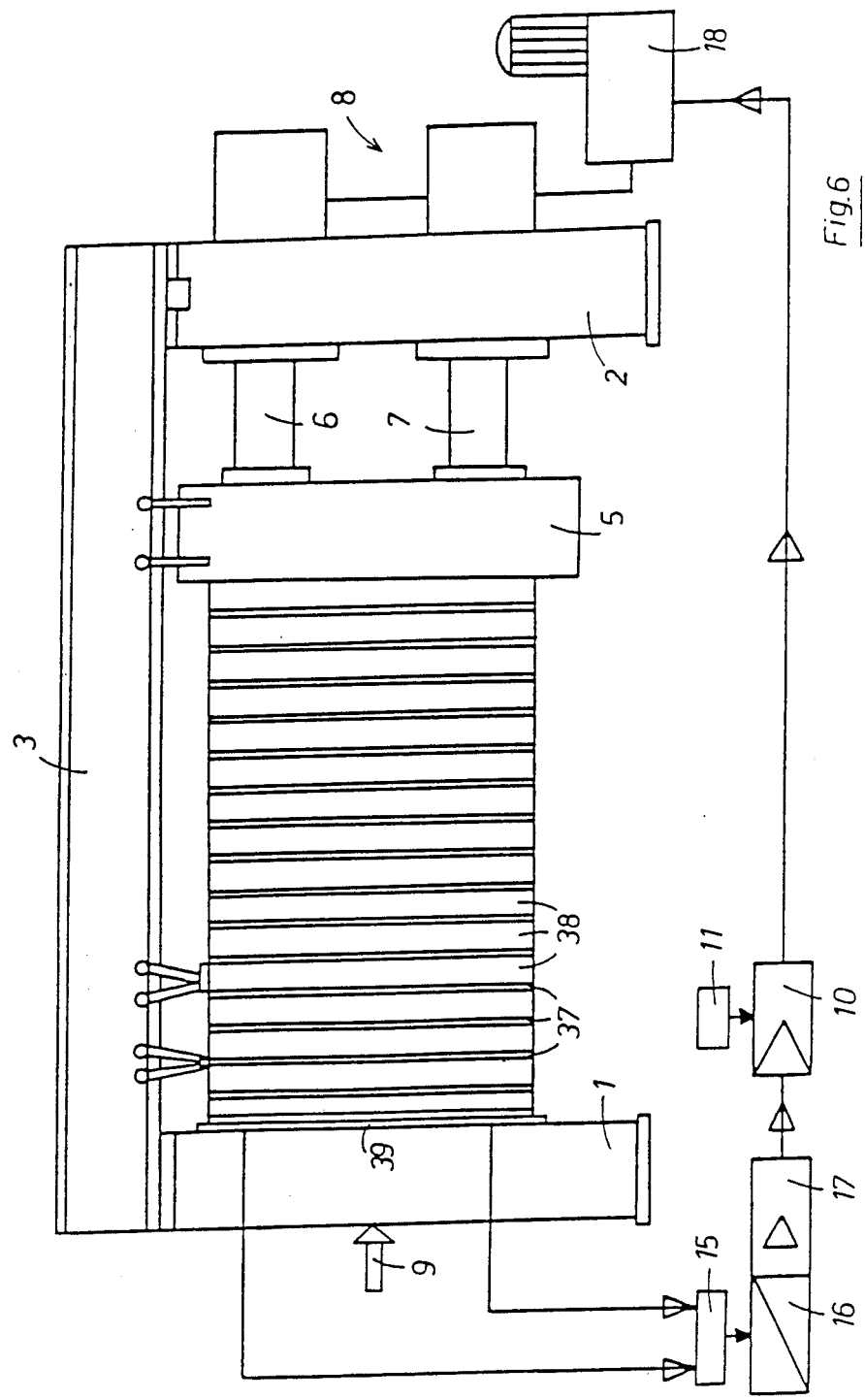
FIG. 6 is a partially schematic view of yet another embodiment of the present invention for regulating the filter plate frame contact pressure.

In FIG. 4, a plate-and-frame filter press is provided wherein the frames 38 are interposed between the flat filter plates 37 and are respectively likewise movable on the upper guide beams 3, with the frames 38 encompassing the filter chambers. In the construction of FIG. 6, a plate 39 of a piezoelectric material is arranged, as a sensor for the pressure prevailing in the filter frame pack, at the end plate 1. The electrical output signal of the plate 39 again corresponds to the contact pressure of the nearest filter plate. The electrical output signal of the piezoelectric sensor plate 39 is utilized as a control variable for the control circuit which is the same construction as the above described embodiments.

In the frame filter press according to FIG. 6, it is also possible, in accordance with the present invention, to utilize, in place of the piezoelectric plate 39, strain gauges as sensors which, in this situation, can suitably be arranged at the narrow sides of the frame 38 in a direct fashion similar to the manner proposed by the construction of FIG. 1 or with the interposition of a measuring element 20, 21 according to the embodiment of FIG. 2.

In all of the above described constructions, the control variable is obtained in dependence upon a compression displacement; however, the control variable can also be obtained in dependence upon a compression force ambient, for example, in a zone of the end plate 1 by, for example, arranging several dynamometer cells at the end plate 1, with the filter plate pack being pressed against these dynamometer cells. A dynamometer cell, also known as force pickups, may be of the type described in, for example, German Patent No. 3,238,951.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A process for regulating a filter plate contact pressure in a plate filter press including a hydraulic closing cylinder means, the method comprising the steps of determining, as a control variable, at least one of a compression force prevailing in a filter plate pack, the compression of an entire filter plate pack, and a compression of at least one portion of the filter plate pack exposed to a compression force ambient in the filter plate pack, and regulating a hydraulic pressure of the hydraulic closing cylinder means in dependence upon a value of a determined compressive force for maintaining a desired compression value, and wherein the step of determining includes providing at least one strain gauge means for determining a compression of at least one of the filter plate, frame, and separate deformation plate exposed to the compression pressure.

2. An apparatus for regulating a filter plate contact pressure in a plate filter press including a hydraulic closing cylinder means, the apparatus comprising a plurality of strain gauge means directly secured on respective narrow sides of at least one of a filter plate, a frame of the filter press and a deformation plate for providing an electrical output signal corresponding to a detected strain, controller means for controlling a hydraulic pressure of the hydraulic closing cylinder means, and means for one of directly transmitting the output signal and transmitting the output signal through a measured value converter to the controller means whereby the hydraulic closing cylinder means is regulated in dependence upon correction signals of the controller means.

3. An apparatus according to claim 2, wherein the strain gauge means are directly secured by an adhesive material.

4. An apparatus according to claim 2, wherein at least one measuring means is provided which is adapted to be deformed upon compression of one of the filter plate, the frame, and deformation plate, said at least one measuring means being arranged on narrow sides of one of the filter plate, frame and deformation plate, the strain gauge means are attached to deformation zones of the at least one measuring means.

5. An apparatus for regulating a filter plate contact pressure in a plate filter press including a hydraulic closing cylinder means, the apparatus comprising at least one strain gauge means arranged on narrow sides of at least one of a filter plate, a frame of the filter press and a deformation plate for providing an electrical output signal corresponding to a detected strain, controller means for controlling a hydraulic pressure of the hydraulic closing cylinder means, means for one of directly transmitting the output signal and transmitting the output signal through a measured value converter to the controller means whereby the hydraulic closing cylinder means is regulated in dependence upon correction signals of the controller means, at least one measuring means adapted to be deformed upon compression of one of the filter plate, the frame, and deformation plate, said at least one measuring means being arranged on narrow sides of one of the filter plate, frame and deformation plate, the strain gauge means are attached to deformation zones of the at least one measuring means, and wherein the at least one measuring means is fashioned as one of a U-shaped and arcuate member having a ridge portion extending substantially perpendicular to a main plane of the filter plate, and wherein two base portions of the measuring means are rigidly attached to narrow sides of one of the filter plate, frame and deformation plate.

6. An apparatus according to claim 5, wherein the at least one measuring means is made of steel.

7. An apparatus according to claim 5, wherein the ridge portion is provided with the strain gauge means on a side facing away from the filter plate pack and on a side facing the filter plate pack. side facing away from the filter plate pack and on a side facing the filter plate pack.

8. An apparatus according to one of claims 5 or 7, wherein threaded flange means are provided on the respective base portions of the measuring means.

9. An apparatus for regulating a filter plate contact pressure in a plate filter press including a hydraulic closing cylinder means, the apparatus comprising at least one strain gauge means inserted in at least one filter plate of a filter plate pack for providing an electrical output signal corresponding to a detected strain, controller means for controlling a hydraulic pressure of the hydraulic closing cylinder means, a means for one of directly transmitting the output signal and transmitting the output signal through a measured value converter to the controller means whereby the hydraulic closing cylinder means is regulated in dependence upon correction signals of the controller means.

* * * * *